United States Patent [19]

Rahier et al.

[11] Patent Number: 4,714,533
[45] Date of Patent: Dec. 22, 1987

[54] ELECTROLYSER FOR HIGHLY-ACTIVE TRITIATED WATER

[75] Inventors: André Rahier, Soumagne; René D. W. Cornelissen, Mol; Aimé Bruggeman, Retie, all of Belgium

[73] Assignee: Studiecentrum voor Kernenergie, S.C.K., Brussels, Belgium

[21] Appl. No.: 853,604

[22] Filed: Apr. 18, 1986

[30] Foreign Application Priority Data

Apr. 25, 1985 [BE] Belgium .............................. 2/60672

[51] Int. Cl.⁴ .................. C25B 9/00; C25B 11/08; C25B 13/04
[52] U.S. Cl. .................................... 204/262; 204/266; 204/279; 204/282; 204/283; 204/284; 204/290 R; 204/292; 204/295
[58] Field of Search .............. 204/262, 266, 283, 284, 204/290 R, 292, 295, 129, 282, 279

[56] References Cited

U.S. PATENT DOCUMENTS

| | | | |
|---|---|---|---|
| 3,993,653 | 11/1976 | Blum et al. | 204/129 X |
| 4,054,496 | 10/1977 | Arrathoon | 204/129 |
| 4,394,244 | 7/1983 | Divisek et al. | 204/295 |
| 4,487,670 | 12/1984 | Bellanger et al. | 204/129 |
| 4,637,866 | 1/1987 | Konishi et al. | 204/129 |

Primary Examiner—Donald R. Valentine
Attorney, Agent, or Firm—Stevens, Davis, Miller & Mosher

[57] ABSTRACT

An inorganic gas separator which has a porosity between 30 and 70% and a pore diameter between 10 and 100 μm, and which is gas impermeable when soaked-through with liquid, is mounted in a frame, divides a cell housing into two compartments, and is moistened by capillarity with liquid fed through channels extending in the frame. In each compartment are mounted a porous foil, an electrode, a pre-electrode, a metal plate and an insulating plate. On the cell-housing thermo-electric heat pumps are mounted for cooling and the unit formed by the housing and the pumps is surrounded by an outer casing.

16 Claims, 2 Drawing Figures

ELECTROLYSER FOR HIGHLY-ACTIVE TRITIATED WATER

BACKGROUND OF THE INVENTION

The invention relates to an electrolyser for highly-active tritiated water, which electrolyser comprises a cell which has a tightly-sealed cell housing, an inorganic porous gas separator which divides the cell housing into two compartments, two electrodes which are respectively mounted in the two compartments, current-supply lines which connect to the electrodes, two gas outlets which connect respectively to the two compartments and at least one liquid inlet which opens on the cell housing inner side.

Such electrolysers are used to recover from the tritiated water which is formed inside a deuterium-tritium fusion reactor, in various locations and mostly when extracting tritium from the breeding material and when purifying the plasma discharge gases, tritium in the form of DT gas which can be used anew in the fuel cycle.

The breaking-down of tritiated water by electrolytic dissociation is considered as one of the best methods for recovering the tritium, as it allows limiting the amount solid tritiated waste and avoiding tritium permeation at high temperature.

An electrolyser making use of existing SPE (Solid Polymer Electrolyte) cells developed by General Electric Company is not suitable for the electrolysis of highly-active tritiated water. The life duration would be but ten hours where an electrolyser for tritium has preferably a life duration of $10^4$ hours.

The gas separator made from organic material does not apparently withstand the high radiation.

Moreover with electrolysis by means of such an electrolyser, a high proportion tritiated water is present in the gas lines.

The electrolyser life duration is markedly improved by making use of an inorganic porous gas separator as in the electrolyser of the above-defined type.

In a first known electrolyser of this kind, the inorganic porous gas separator is made from asbestos. Said flat gas separator is arranged vertically and moistened with 6 M-NaOH, and 1 M-NaOH is continuously sprayed on said separator.

Said electrolyser has however a large liquid content and particularly a large electrolyte content. The necessity of spraying the gas separator with 1 M-NaOH requires electrolyte flow by means of a pump which is mounted outside the electrolysis cell proper. Such flow is a drawback. Moreover due to spraying the gas separator with electrolyte, there is formed an undesirable electrolyte mist in the oxygen gas stream, in such a way that "demisters" are required to remove such mist. The system for spraying electrolyte on the gas separator also has a limited durability.

A second known electrolyser with an inorganic porous gas separator has a ceramic gas separator from stabilized zirconium with 8% CaO.

In this electrolyser, no liquid electrolyte is being used. Said electrolyser works then also at very high temperatures, which has a disadvantageous influence as regards corrosion and tritium permeability, and causes metal embrittlement. A very high tritiated water content is also present in the tritium gas. Said known electrolyser has a low tritium-recovery capacity.

THE INVENTION

The invention has for object to obviate said drawbacks and to provide an electrolyser of the above-defined type with an inorganic porous gas separator which can work with a small electrolyte content, which has a high reliability, a long life duration and high durability against radiation, and which requires little maintenace.

For this purpose, the porous gas separator has a porosity between 30 and 70%, and a pore diameter between 10 and 100 $\mu$m, and is gas impermeable when soaked-through with liquid, the liquid inlet opens on the gas separator in such a way that said separator is moistened by capillarity with the liquid fed through the liquid inlet, and both electrodes lie in moistening contact with the gas separator, in such a way that when said separator is moistened, said electrodes are also moistened.

In a particular embodiment of the invention, the electrodes each engage through a porous film, the gas separator.

In a remarkable embodiment of the invention, the cell comprises two pre-electrodes provided with openings, which engage respectively in both compartments, on the gas separator-removed side, the electrode in the pertaining compartment, and the gas outlet which connects to the pertaining compartment communicates with that space formed by the pre-electrode lying in said compartment.

A suitable anode is a perforated anode from platinum or a metal from the platinum group, while a suitable cathode is a perforated cathode which is coated with a noble metal.

In a useful embodiment of the invention, the cell comprises a metal frame which is mounted inside the cell housing and which engages with the periphery thereof the inner periphery of said cell housing, the gas separator is secured with the edges thereof to said frame, and the liquid inlet lies with a part thereof at least in said frame, along the gas separator edge.

The liquid inlet preferably forms both the inlet for liquid electrolyte and the inlet for the tritiated water.

In another particular embodiment of the invention, the electrolyser comprises cooling means which are mounted in front of the electrodes, on the cell housing outer side.

In said known electrolyser with ceramic gas separator on zirconium-basis, no cooling means are provided.

The cooling means preferably comprise in front of each electrode, at least one thermoelectric pump.

In the above mentioned electrolysers based on SPE cells, and in the above mentioned electrolyser with asbestos gas separator, cooling occurs by means of an outer cooling fluid flow. Not only such cooling means do bring the danger of leaks, but also they do not allow as good a cell cooling as there may be obtained by means of thermoelectric pumps.

Usefully, the cooling means have such a cooling capacity that they can cool the cell during the electrolysis down to a temperature between $-5°$ and $20°$ C.

Other features and advantages of the invention will stand out from the following description of an electrolyser for highly-active tritiated water according to the invention; this description is only given by way of example and does not limit the invention; the reference numerals pertain to the accompanying drawings

DRAWINGS

In both figures, the same reference numerals pertain to the same elements.

DESCRIPTION OF A PREFERRED EMBODIMENT

Figure 1:
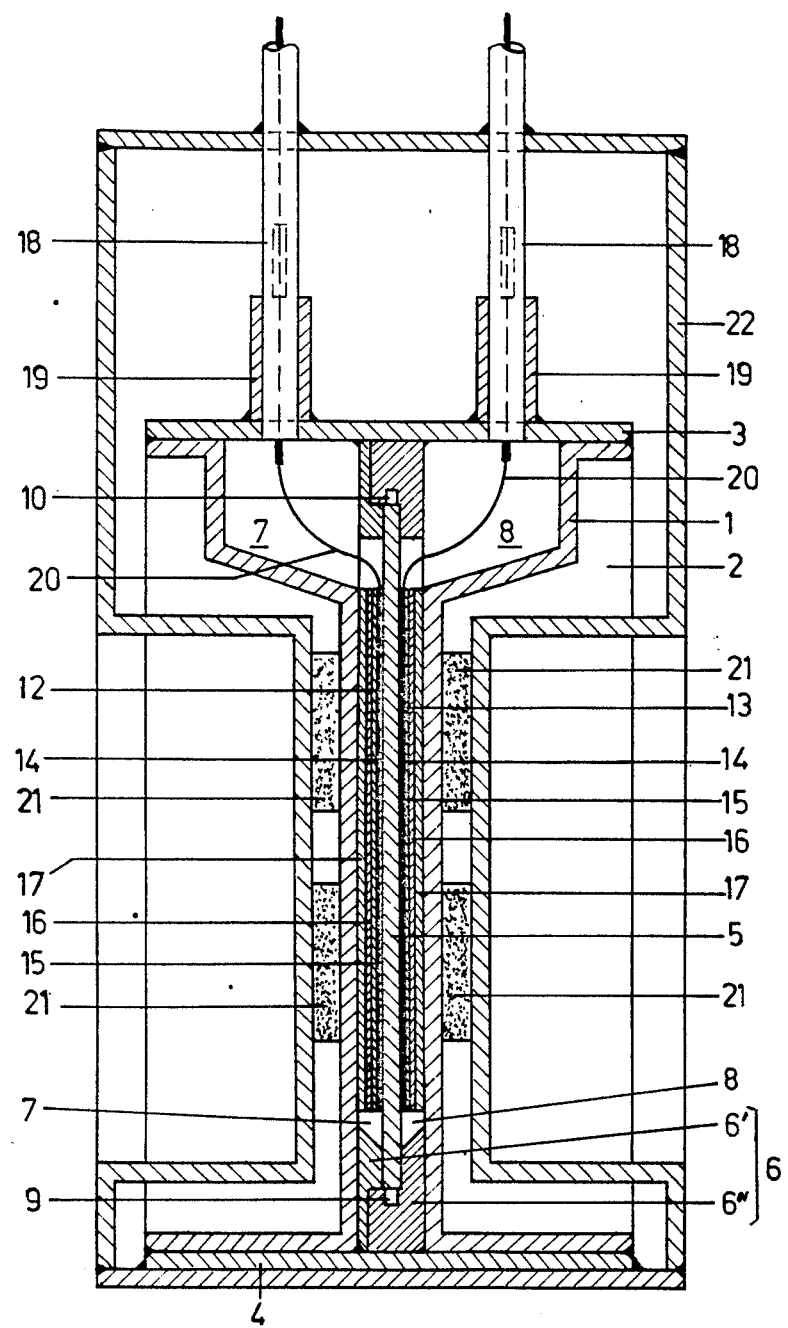
FIG. 1 is a vertical cross-section through an electrolyser for highly-active tritiated water according to the invention.
Figure 2:
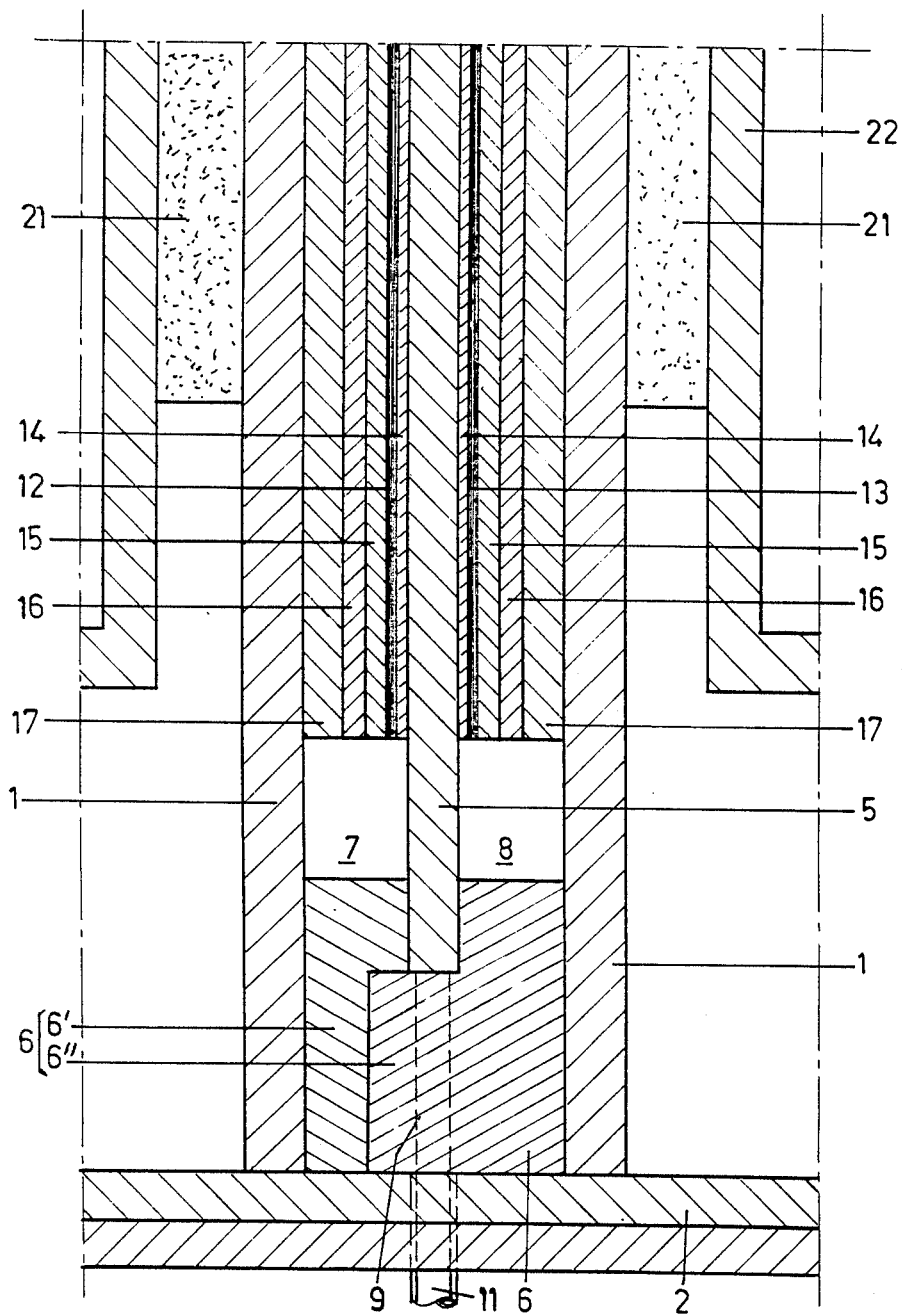
FIG. 2 is a horizontal cross-section through part of the electrolyser as shown in FIG. 1, but drawn on a larger scale.

The electrolyser for highly-active tritiated water as shown in the figures, comprises a cell which is bounded by a tightly-sealed metal cell housing 1-4.

The cell housing 1-4 is comprised of two upstanding lengthwise side-walls 1, two upstanding cross side-walls 2, an uppermost cover 3, and a lowermost cover 4.

Both upstanding lengthwise side-walls 1 diverge at a short distance from the top side. Above and below said location, the upstanding side-walls 1 extend in parallel relationship with one another. The uppermost and lowermost edges of the side-walls 1 are bent outwards and said edges have such a width that the total width along the cross-wise direction of said cell housing 1-4 is the same at the top and the bottom. Both upstanding cross side-walls 2 have over the whole height thereof, said width and they are welded to the edges of side-walls 1. The covers 3 and 4 are welded respectively at the top and bottom, against the bent-over edges of the upstanding lengthwise side-walls 1 and against the uppermost and lowermost edges of the upstanding cross side-walls 2.

A vertical flat, inorganic porous gas separator 5 which extends along the lengthwise direction and which is enclosed with the periphery thereof in a metal frame 6, divides the cell housing 1-4 into two compartments 7 and 8. The frame 6 is secured with the outer circumference thereof against the side-walls 2 and the covers 3 and 4, and it is comprised for structural reasons of two part frames 6' and 6" which are fastened to one another.

Fastening to one another of part frames 6' and 6" and securing of said part frames to cell housing 1-4 preferably occurs by welding.

The inorganic gas separator 5 is attached to frame 6, for example by gluing.

The gas separator 5 has a porosity from 30 to 70%, and a pore diameter from 10 to 100 μm. When the gas separator is moistened with a liquid, it is impervious to gases.

The gas separator may be made from various inorganic materials, but the preference is given to sintered quartz glass (vitreous silica), or porous ceramic materials such as $Al_2O_3$-$ZrO_2$.

In that part of frame 6 which is secured to the lowermost cover 4, a liquid channel 9 is hollowed-out exactly along the lowermost edge of gas separator 5.

In that part of frame 6 which is fastened to the uppermost cover 3, a liquid inlet channel 10 is also hollowed-out along the uppermost edge of gas separator 5.

Both channels 9 and 10 each open with one end thereof on a supply line 11. Said supply lines 11 extend through an upstanding cross side-wall 2 to outside said cell housing 1-4.

Inside compartment 7, a flat anode 12 is arranged by means of a foil 14, against the flat gas separator 5.

In a similar way, inside compartment 8, a flat cathode 13 is arranged by means of a foil 14, against the flat gas separator 5.

The anode is a perforated platinum anode and the cathode is a perforated gold-plated cathode which is for example made from gold-plated nickel. When one works with an alkaline electrolyte, the gold-plating may possibly be dispensed with.

The porous foil 14 is made from metal or ceramics, and provides for an even contact surface between electrodes 12 and 13 and gas separator 5, and for the required flexibility between said components. When the gas separator 5 is moistened, both electrodes 12 and 13 are also moistened through foils 14.

The required volumes for discharging that gas which is formed during electrolysis in the location of electrodes 12 and 13, are formed by pre-electrodes 15 from expanded metal, or formed by so-called "studs", which pre-electrodes are arranged against that side removed from gas separator 5, of anode 12, respectively cathode 13.

Inside each of said compartments 7 and 8, a metal plate 16 is arranged on that side removed from gas separator 5, of the pre-electrode 15, to spread the heat generated during the electrolysis.

Between each flat metal plate 16 and the upstanding lengthwise side-wall 1, lying in front of it, a ceramic electrically-insulating plate 17 is arranged.

The above-described unit formed by gas separator 5, electrodes 12 and 13, foils 14, pre-electrodes 15, metal plates 16 and insulator plates 17, is clamped between both upstanding lengthwise side-walls 1 of cell housing 1-4. To the exception of gas separator 5, all the components from said unit extend to a distance from said metal frame 6.

In this way, the gases can escape from the pre-electrodes 15 in compartments 7 and 8. The gases are discharged from each of said compartments 7 and 8 through a gas outlet line 18 which is fastened to a passageway 19 which is mounted on the uppermost cover 3 and which opens on the pertaining compartment.

In front and in back of said two gas outlet lines 18, four current supply lines 20 extend (two in front and two in back of the gas outlet lines). Two such supply lines are secured to anode 12 and two to cathode 13.

On the outer side of side-walls 1 of cell housing 1-4, a number of thermo-electric heat pumps 21 are located in front of anode 12, respectively cathode 13.

Said thermoelectric heat pumps have a structure known per se and are available in the trade for other purposes than for electrolysers.

The number of heat pumps 21 is so selected that the temperature inside cell housing 1-4 during the electrolysis may be kept between −5° and 20° C., and preferably between 0° and 5° C. Such low electrolysis temperature lowers corrosion, lowers tritium permeability and lowers the tritiated water partial pressure in the gases.

About said cell housing 1-4 and the heat pumps 21 mounted thereon, a tightly-sealed metal outer casing 22 is arranged. The various parts from said casing 22 are welded together. Said outer casing 22 is used as second shielding and forms the support for the thermoelectric heat pumps 21. The upstanding lengthwise side-walls from said outer casing 22 project inwards thereby in front of the heat pumps 21.

The outer casing 22 is provided with openings for the passage of the two liquid inlet lines 11, the two gas outlet lines 18 and the four current supply lines 20. Said openings are sealed around said lines. The lines 11 are for example from metal and sealed in the location of said openings by welding to the outer casing 22.

The electrolyte is fed before the electrolysis to the lowermost liquid channel 9. Said electrolyte is distributed by capillarity in the gas separator 5.

An acid electrolyte as well as a basic one may be used.

Use may be made as acid electrolyte, of 30-60 weight % sulphuric acid.

In such a case, the gas separator 5 is preferably made from sintered quartz glass and said metal parts such as notably cell housing 1-4 are made from Incoloy 825 or 20 Alloy.

Use may be made as basic electrolyte, of 5-45 weight % potassium hydroxide.

In such a case, the gas separator 5 is preferably made from ceramic material and the metal parts such as cell housing 1-4, are for example from stainless steel 316. As already stated, the anode may be from pure nickel which does not have to be lined with a noble metal coating layer.

An outer electrolyte circulation is not required as there is neither anolyte, nor catholyte.

The electrolyser contains a very small electrolyte content, namely but 10 ml.

The tritiated water to be electrolysed is fed through one of the liquid inlet channels 9 or 10. Means obvious to the man skilled in the art are provided to let the water supply occur alternately through the lowermost channel 9 and the uppermost channel 10, and preferably four times longer through lowermost channel 9 than through the uppermost channel 10. The water fed in one of channels 9 or 10 spreads by capillarity over the gas separator 5.

The alternate feeding at the bottom and the top, of the water is necessary to obviate concentration differences which appear in gas separator 5.

During the electrolysis, a current is fed through the current supply lines 20, to electrodes 12 and 13, in such a way that the electrode current density lies between 5 and 40 A $dm^{-2}$, which allows producing 32 to 250 normal liters tritium per day.

The electrolyser has a small liquid content as liquid is only present in gas separator 5 and in inlet channels 9 and 10.

The electrolyser comprises no mechanical seals, so that it is completely leak-free. Moreover the active area of the electrolyser is surrounded by two casings, namely cell housing 1-4 and outer casing 22.

All the materials being used are resistant to chemical or electrochemical influences and radiation influences, in such a way that the electrolyser has a very long life duration.

There occurs no external flowing or returning of radio-active fluids. The only radio-active fluids which flow in and out the electrolyser are the tritiated water and the $T_2$ and $O_2$ gases.

The electrolysis occurs at low temperature whereby the vapour pressure of tritiated water in the resulting gases is lowered, the corrosion is lowered, the tritium permeability decreases and metal embrittlement is excluded.

The invention is in no way limited to the above-described embodiment and within the patent application scope, many changes may be brought to the described embodiment, notably as regards the shape, the composition, the arrangement and the number of components being used to embody the invention.

Particularly, the cell housing or the outer casing should not necessarily be made from metal. The cell housing or the outer casing may for example also be made from ceramic material.

The gas separator should not necessarily be made from the described materials. It may also be made from other inorganic materials as far as the defined porosity is obtained and said materials are resistant enough to the radio-active radiation and the electrolyte being used.

We claim:

1. An electrolyser for highly-active tritiated water, which electrolyser comprises a cell, which cell has:
   a tightly-sealed cell housing,
   an inorganic porous gas separator which has a porosity between 30 and 70%, and a pore diameter between 10 and 100 $\mu$m, and is gas impermeable when soaked-through with liquid, which separator divides said cell housing into two compartments,
   two electrodes which are respectively mounted in said two compartments and which both lie in moistening contact with the gas separator, in such a way that when said latter separator is moistened, said electrodes are also moistened,
   current-supply lines which connect to said electrodes,
   two gas outlets which connect respectively to the two compartments, and
   at least one liquid inlet which opens on the gas separator in such a way that said latter separator is moistened by capillarity with the liquid fed through the liquid inlet.

2. An electrolyser as defined in claim 1, in which said cell comprises two porous foils, said electrodes each engaging the gas separator through one of said foils.

3. An electrolyser as defined in claim 1, in which the cell comprises two pre-electrodes provided with openings, which pre-electrodes engage respectively in both compartments, on the gas separator-removed side, the electrode in the pertaining compartment, and the gas outlet which connects to the pertaining compartment communicates with that space formed by the pre-electrode lying in said compartment.

4. An electrolyser as defined in claim 3, in which the cell comprises heat-spreading metal plates, which engage respectively in both compartments that side removed from the gas-separator, of the pre-electrodes.

5. An electrolyser as defined in claim 1, in which the cell comprises insulators which are arranged in each compartment against the cell housing inner side and insulate the electrodes from the cell housing.

6. An electrolyser as defined in claim 1, in which the anode is a perforated anode from platinum or a metal from the platinum group.

7. An electrolyser as defined in claim 1, in which the cathode is a perforated cathode which is coated with a noble metal.

8. An electrolyser as defined in claim 1, in which the cell comprises a metal frame which is mounted inside the cell housing and which engages with the periphery therof the inner periphery of said cell housing, the gas separator is secured with the edges thereof to said frame, and the liquid inlet lies with a part therof at least in said frame, along the edge of said gas separator.

9. An electrolyser as defined in claim 1, in which said liquid inlet forms both the inlet for liquid electrolyte and the inlet for the tritiated water.

10. An electrolyser as defined in claim 1, in which the gas separator is arranged vertically and the liquid inlet comprises two liquid inlet channels which open respectively on the top and the bottom of said gas separator.

11. An electrolyser as defined in claim 10, in which the cell comprises a metal frame which is mounted inside the cell housing and which engages with the periphery thereof the inner periphery of said cell housing, the gas separator is secured with the edges thereof to said frame, the liquid inlet lies with a part thereof at least in said frame, along the edge of said gas separator and said two liquid inlet channels are arranged respectively in the uppermost part of the vertical frame, along the top edge of said gas separator, and in the lowermost part of said frame, along the bottom edge of said gas separator.

12. An electrolyser as defined in claim 1, which further comprises cooling means which are mounted in front of the electrodes, on the outer side of the cell housing.

13. An electrolyser as defined in claim 12, in which the cooling means comprise in front of each electrode, at least one thermoelectric pump.

14. An electrolyser as defined in claim 12, in which said cooling means have such a cooling capacity that they can during the electrolysis, cool the cell down to a temperature lying between $-5°$ and $20°$ C.

15. An electrolyser as defined in claim 14, in which the cooling means have such a cooling capacity that they can during the electrolysis, cool the cell down to a temperature lying between $0°$ and $5°$ C.

16. An electrolyser as defined in claim 12, which further comprises an outer casing which surrounds the unit formed by the cell with the cell housing and the cooling means.

* * * * *